United States Patent
Hooyman et al.

(10) Patent No.: US 10,772,261 B1
(45) Date of Patent: Sep. 15, 2020

(54) EXTENDABLE SAW

(71) Applicant: BATTENFELD TECHNOLOGIES, INC., Columbia, MO (US)

(72) Inventors: Andrew Hooyman, Menasha, WI (US); William T. Hooyman, Kiel, WI (US); Robert S. Fuller, West Bend, WI (US); Jason Richards, West Bend, WI (US)

(73) Assignee: AOB Products Company, Columbia, MO (US)

(*) Notice: Subject to any disclaimer, the term of this patent is extended or adjusted under 35 U.S.C. 154(b) by 0 days.

(21) Appl. No.: 15/459,953

(22) Filed: Mar. 15, 2017

Related U.S. Application Data

(63) Continuation of application No. 11/977,948, filed on Oct. 26, 2007, now Pat. No. 9,643,266.

(60) Provisional application No. 60/854,890, filed on Oct. 27, 2006.

(51) Int. Cl.
| | | |
|---|---|---|
| *A01G 3/08* | (2006.01) | |
| *B25G 1/04* | (2006.01) | |
| *B23D 51/03* | (2006.01) | |
| *B26B 21/52* | (2006.01) | |

(52) U.S. Cl.
CPC ............. *A01G 3/083* (2013.01); *B23D 51/03* (2013.01); *B25G 1/04* (2013.01); *B26B 21/523* (2013.01)

(58) Field of Classification Search
CPC . A01G 3/08; A01G 3/083; B25G 1/04; B23D 51/01; B23D 51/03; B23D 51/10; B23D 49/12; B23D 49/162; B23D 49/14; Y10T 16/4719; Y10T 16/473; Y10T 16/32467; Y10T 16/469; Y10T 16/476

USPC ......... 30/340, 506, 507, 509, 510, 514, 517, 30/518, 519, 166.3, 25, 329–339, 296.1; 16/429, 427, DIG. 15; 81/489
See application file for complete search history.

(56) References Cited

U.S. PATENT DOCUMENTS

| | | | |
|---|---|---|---|
| 660,204 A | | 10/1900 | Seelye |
| 748,036 A | * | 12/1903 | Argubright et al. .... F16B 12/58 5/287 |
| 763,100 A | | 6/1904 | Howell |
| 1,639,614 A | | 8/1927 | Rosson |
| 1,769,400 A | | 7/1930 | Talmage |

(Continued)

FOREIGN PATENT DOCUMENTS

DE 7425295 7/1974

OTHER PUBLICATIONS

Final Rejection dated Dec. 5, 2014, U.S. Appl. No. 12/731,373, 10 pages.

(Continued)

*Primary Examiner* — Laura M Lee
(74) *Attorney, Agent, or Firm* — Stinson LLP

(57) ABSTRACT

The present invention relates to an extendable folding saw that is lightweight and compact when retracted yet rigid when extended. In one embodiment, the extendable folding saw can have a folding saw and a removably attached extension. The folding saw can have a grip and a pivotally attached saw. The extension can comprise several members that are compactable to a length not much greater than the length of the longest individual member. The members of the extension can have a generally I shaped profile. The extension rod can be attached to the folding saw in a snap-fitting manner for use. A retracted folding saw can be snapped side-by-side to a retracted to extension rod for storage.

18 Claims, 9 Drawing Sheets

(56) References Cited

U.S. PATENT DOCUMENTS

| | | | |
|---|---|---|---|
| 1,797,589 A | 3/1931 | Price | |
| 1,807,347 A * | 5/1931 | Schweigert | B25D 1/02 |
| | | | 81/25 |
| 1,943,890 A | 1/1934 | Gibson et al. | |
| 2,286,530 A | 6/1942 | Fordon | |
| 2,593,323 A | 4/1952 | Magnussen et al. | |
| 3,039,340 A | 6/1962 | Zimmerman | |
| 3,076,263 A | 2/1963 | Musto | |
| 3,211,198 A * | 10/1965 | Glasgow | B25D 1/02 |
| | | | 81/19 |
| 3,347,575 A | 10/1967 | Morris | |
| 3,360,858 A | 1/1968 | Cowley | |
| 3,613,283 A | 10/1971 | Mozey | |
| 3,805,552 A | 4/1974 | Heald | |
| D237,458 S | 11/1975 | Laughlin | |
| 3,973,179 A | 8/1976 | Weber et al. | |
| 4,033,036 A | 7/1977 | Moore | |
| 4,050,003 A | 9/1977 | Owings et al. | |
| 4,082,186 A | 4/1978 | Chirumbolo | |
| 4,122,601 A | 10/1978 | Katsuya | |
| 4,167,811 A | 9/1979 | Barrett | |
| 4,553,753 A | 11/1985 | Gibbons | |
| 4,622,022 A | 11/1986 | Diffenderfer et al. | |
| 4,643,326 A * | 2/1987 | Klingler | A47G 23/0233 |
| | | | 220/212.5 |
| 4,654,971 A | 4/1987 | Fettes et al. | |
| 4,660,284 A | 4/1987 | Decarolis | |
| 4,687,012 A | 8/1987 | Schultes et al. | |
| 4,716,653 A * | 1/1988 | Skyba | A01G 3/08 |
| | | | 16/DIG. 25 |
| D300,112 S | 3/1989 | Osterhout | |
| D304,154 S | 10/1989 | Osterhout | |
| 4,900,090 A | 2/1990 | Davis | |
| 4,919,558 A | 4/1990 | Mascitelli et al. | |
| 4,926,522 A | 5/1990 | Wang | |
| 4,947,551 A | 8/1990 | Deisch | |
| 4,976,031 A | 12/1990 | Miller | |
| 5,063,628 A | 11/1991 | Campbell | |
| 5,074,081 A * | 12/1991 | Beth | B24B 23/005 |
| | | | 451/344 |
| 5,167,069 A * | 12/1992 | Quinn | B26B 21/523 |
| | | | 30/527 |
| D346,937 S | 5/1994 | Backman | |
| 5,400,457 A * | 3/1995 | Ridgley | A46B 5/0033 |
| | | | 15/144.4 |
| 5,477,750 A | 12/1995 | Korzan | |
| 5,507,203 A | 4/1996 | Audibert et al. | |
| 5,515,574 A | 5/1996 | Larson | |
| 5,538,474 A | 7/1996 | Kretschmer et al. | |
| 5,553,386 A | 9/1996 | Hsu | |
| 5,579,558 A | 12/1996 | Newman et al. | |
| 5,634,276 A | 6/1997 | Lin | |
| 5,636,697 A | 6/1997 | Pitchford | |
| 5,694,695 A | 12/1997 | Lund | |
| D392,164 S | 3/1998 | Bomgaars, Jr. | |
| D397,281 S * | 8/1998 | Hsu | D8/95 |
| 5,787,536 A | 8/1998 | Pate | |
| 5,787,590 A | 8/1998 | D'Alessandro, Sr. | |
| 5,794,345 A | 8/1998 | Ryon et al. | |
| 5,810,408 A | 9/1998 | Armstrong | |
| 5,845,404 A | 12/1998 | Jeffcoat | |
| 5,860,216 A | 1/1999 | Shellnutt | |
| D406,039 S | 2/1999 | Okada | |
| 5,911,781 A | 6/1999 | Yost | |
| 5,924,210 A * | 7/1999 | Hung | B23D 51/01 |
| | | | 30/166.3 |
| 5,926,911 A | 7/1999 | Chen | |
| 6,014,785 A | 1/2000 | Punch et al. | |
| 6,035,873 A | 3/2000 | Lin et al. | |
| D426,436 S | 6/2000 | Ng | |
| D433,914 S | 11/2000 | Chu | |
| 6,181,032 B1 | 1/2001 | Marshall et al. | |
| 6,217,455 B1 | 4/2001 | Yanata | |
| 6,240,642 B1 | 6/2001 | Templeton | |
| D444,684 S | 7/2001 | Kimura | |
| 6,253,455 B1 * | 7/2001 | Eriksson | B23D 51/01 |
| | | | 30/155 |
| 6,298,564 B1 | 10/2001 | Voser et al. | |
| 6,363,614 B1 * | 4/2002 | Umstead | B23D 51/01 |
| | | | 30/144 |
| 6,371,686 B1 | 4/2002 | Wu | |
| 6,446,341 B1 | 9/2002 | Wang et al. | |
| 6,488,511 B1 | 12/2002 | Stewart | |
| 6,536,723 B1 | 3/2003 | Nakatani | |
| 6,560,805 B2 * | 5/2003 | Dallas | A01B 1/022 |
| | | | 7/116 |
| D482,257 S | 11/2003 | Taylor et al. | |
| 6,694,620 B2 | 2/2004 | Kanzawa | |
| 6,694,621 B1 | 2/2004 | Boley et al. | |
| 6,742,264 B1 | 6/2004 | Urion | |
| 6,796,389 B1 | 9/2004 | Pusateri et al. | |
| 6,830,227 B2 | 12/2004 | Nakatani | |
| 6,854,697 B2 | 2/2005 | Akalke | |
| 6,883,208 B1 | 4/2005 | Huang | |
| 6,898,858 B1 | 5/2005 | Spell | |
| 7,017,234 B2 | 3/2006 | Anderson | |
| 7,065,885 B1 | 6/2006 | Chen | |
| D530,180 S | 10/2006 | Klecker et al. | |
| D551,524 S | 9/2007 | Norton et al. | |
| 7,337,933 B1 * | 3/2008 | Klinberg | A47G 25/82 |
| | | | 223/118 |
| 7,574,806 B2 | 8/2009 | Wang | |
| 7,600,287 B1 | 10/2009 | Moore | |
| 7,802,340 B2 * | 9/2010 | Knopow | A47L 13/24 |
| | | | 15/144.1 |
| 7,958,640 B1 | 6/2011 | Mandriota | |
| 8,266,806 B2 | 9/2012 | Holmroos | |
| 9,532,510 B2 * | 1/2017 | Pringnitz | B27B 21/04 |
| 2002/0133953 A1 * | 9/2002 | Kanzawa | B23D 51/03 |
| | | | 30/153 |
| 2002/0194739 A1 | 12/2002 | Krane et al. | |
| 2003/0177648 A1 | 9/2003 | Zeiter | |
| 2004/0020062 A1 | 2/2004 | Ducret | |
| 2004/0107585 A1 | 6/2004 | Heimrich | |
| 2005/0097691 A1 | 5/2005 | Tsuchiya et al. | |
| 2005/0247523 A1 * | 11/2005 | Sewell | B25G 1/04 |
| | | | 182/187 |
| 2006/0048397 A1 | 3/2006 | King et al. | |
| 2007/0187441 A1 | 8/2007 | Klinberg | |
| 2007/0240545 A1 | 10/2007 | Lin | |
| 2008/0109975 A1 | 5/2008 | Park et al. | |
| 2009/0064511 A1 | 3/2009 | Crawford | |
| 2009/0172950 A1 * | 7/2009 | Jenkinson | A01G 3/00 |
| | | | 30/155 |
| 2014/0090256 A1 * | 4/2014 | Pringnitz | B27B 21/04 |
| | | | 30/161 |
| 2016/0000017 A1 * | 1/2016 | Pringnitz | B25G 1/04 |
| | | | 144/343 |

OTHER PUBLICATIONS

Non-Final Rejection dated Feb. 20, 2013, U.S. Appl. No. 12/731,373, 10 pages.

Final Rejection dated Nov. 7, 2013, U.S. Appl. No. 12/731,373, 11 pages.

Non-Final Rejection dated May 21, 2014, U.S. Appl. No. 12/731,373, 9 pages.

Fiskars Brands, Inc., Tele-Cutter Extendable Pruner, as viewed on Feb. 20, 2008 at www.gerbergear.com/product.php?model=1512, 1 page.

Trail Blazer, Marks Choice Xtend-A-Saw, as viewed on as viewed on Feb. 20, 2008 at www.trailblazerproducts.com/products/list/showcase/?id=63, 2 pages.

Buckwing Products, Inc., Archery Hunters Back Pack Extension Saw & Pruner, as viewed on Feb. 20 and 21, 2008 at www.buckwing.com/tools.html, 2 pages.

Go Way Out, Hunting Accessories including Saw, Trimmer and Poles, as viewed on Feb. 20, 2008 at www.gowayout.com/, 1 page.

Stoney Point, PoleCat Pole Saw Attachment, as viewed on Feb. 20, 2008 at www.midwayusa.com/eprductpage.exe/showpage?saleitemid=852382&utm_source, 1 page.

(56) References Cited

OTHER PUBLICATIONS

Office Action dated May 17, 2010, U.S. Appl. No. 11/977,948, 6 pages.
Non-Final Rejection dated Aug. 31, 2010, U.S. Appl. No. 11/977,948, 12 pages.
Final Rejection dated Feb. 3, 2011, U.S. Appl. No. 11/977,948, 16 pages.
Non-Final Rejection dated Jun. 23, 2011, U.S. Appl. No. 11/977,948, 13 pages.
Final Rejection dated Dec. 7, 2011, U.S. Appl. No. 11/977,948, 18 pages.
Non-Final Rejection dated Aug. 27, 2012, U.S. Appl. No. 11/977,948, 12 pages.
Final Rejection dated Mar. 14, 2013, U.S. Appl. No. 11/977,948, 15 pages.
Non-Final Rejection dated Feb. 11, 2014, U.S. Appl. No. 11/977,948, 9 pages.
Final Rejection dated Dec. 18, 2014, U.S. Appl. No. 11/977,948, 9 pages.
Office Action dated Jul. 30, 2015, U.S. Appl. No. 11/977,948, 6 pages.
Non-Final Rejection dated Oct. 2, 2015, U.S. Appl. No. 11/977,948, 16 pages.
Final Rejection dated Feb. 29, 2016, U.S. Appl. No. 11/977,948, 15 pages.
Non-Final Rejection dated Jun. 3, 2016, U.S. Appl. No. 11/977,948, 9 pages.

* cited by examiner

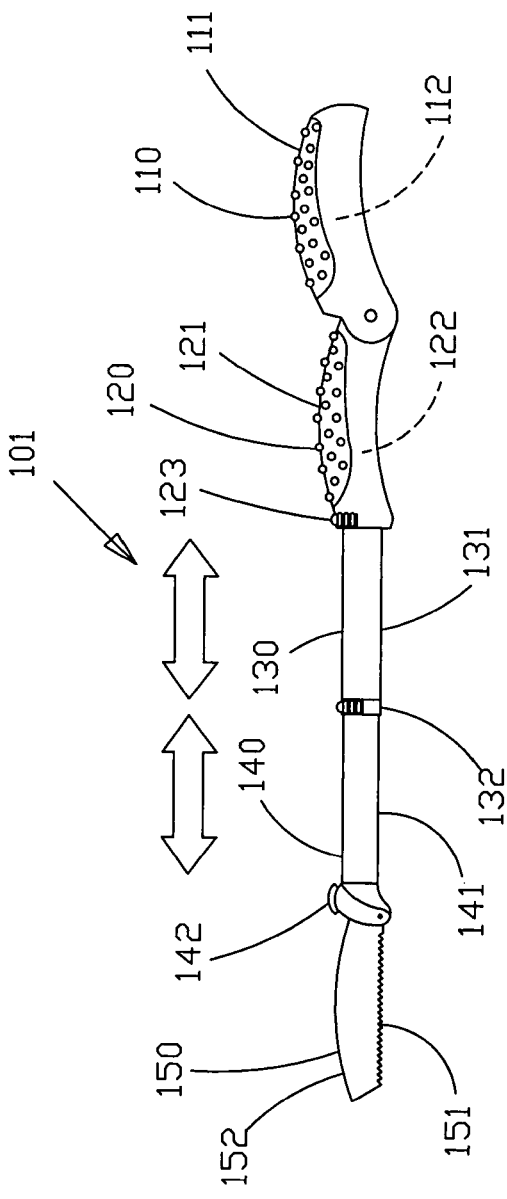
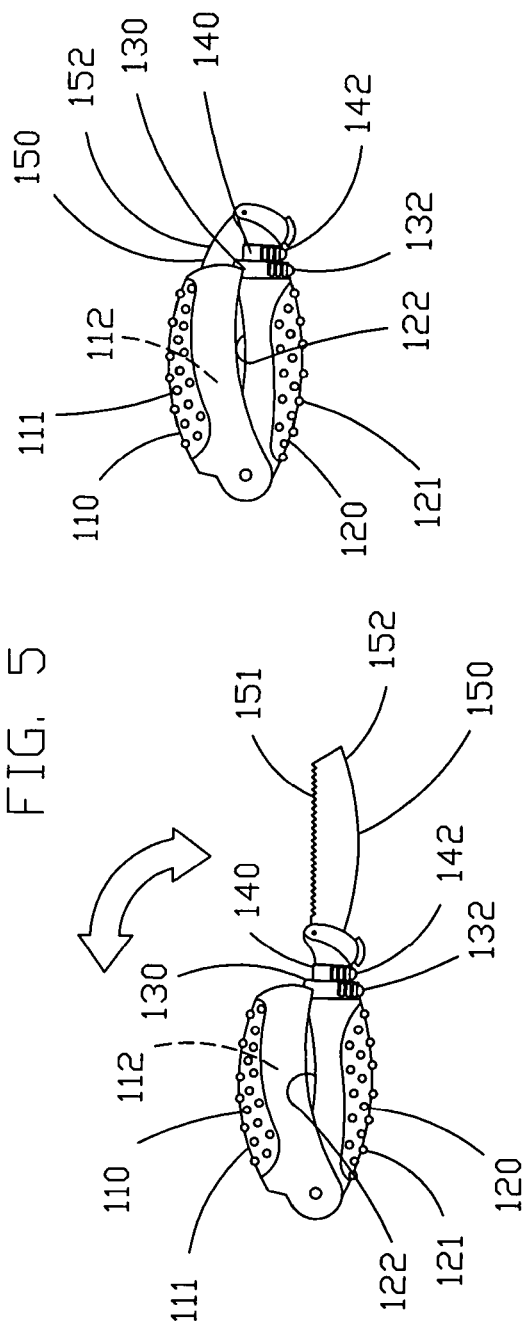

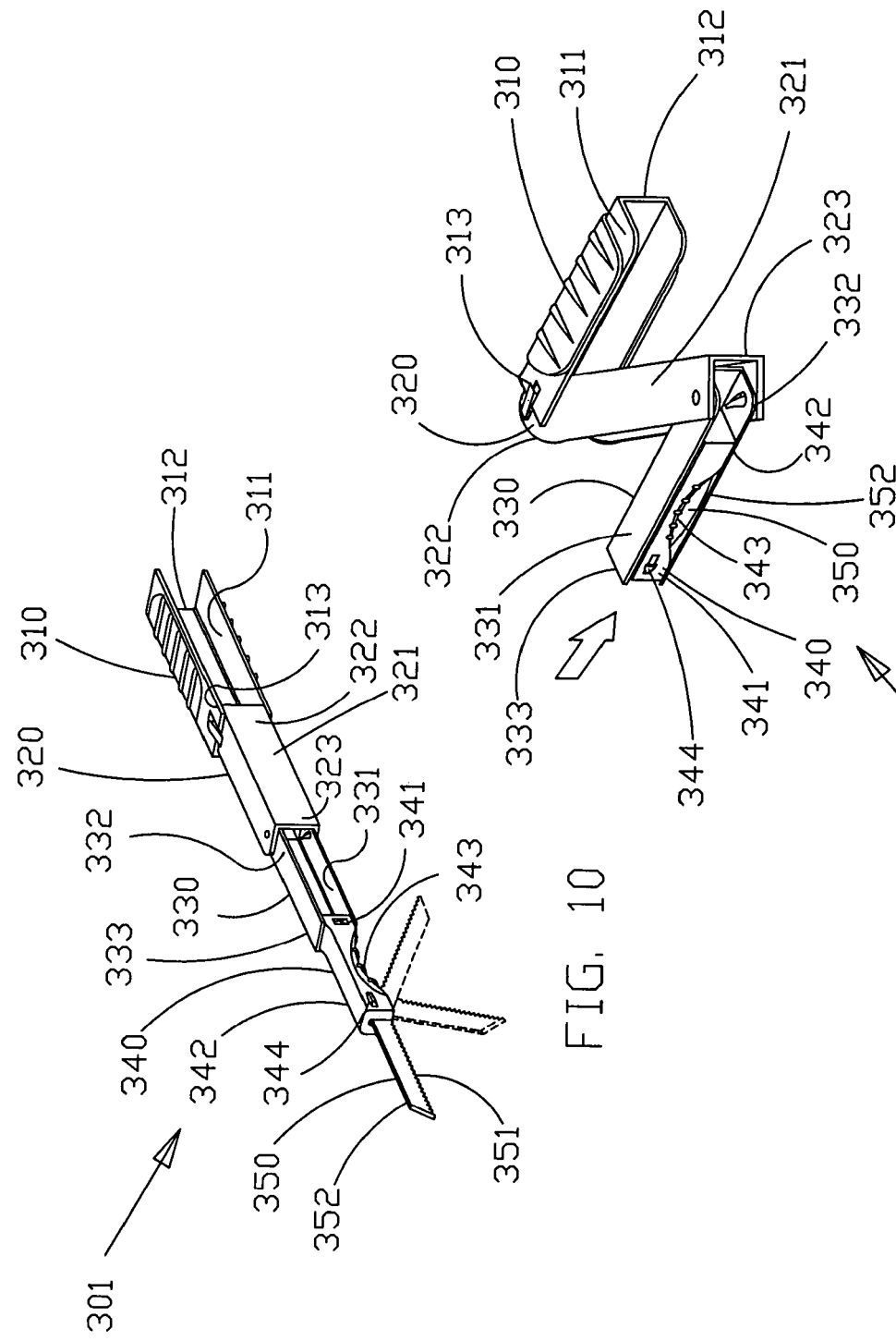

EXTENDABLE SAW

CROSS-REFERENCE TO RELATED APPLICATION

This application is a continuation of U.S. patent application Ser. No. 11/977,948, filed Oct. 26, 2007, which claims priority to U.S. Provisional Application No. 60/854,890, filed on Oct. 27, 2006, each of which is hereby incorporated by reference in its entirety.

BACKGROUND

Field

The present invention relates to an extendable folding saw that is lightweight and compact when retracted yet rigid when extended.

Description of Related Art

Several cutting products have been developed over the years. Some are designed for use as folding saws, and others for use as extending saws. Some examples of currently available products include.

Gerber makes an extendable pruner under the name Tele-Cutter. This pruner has a telescoping extension pole. Yet, the blade does not retract into a handle, which can limit the safety of the device when not in use.

Trail Blazer makes a saw called Xtend-A-Saw. This item features a handle with a socket for threadably receiving the end of an extension pole. The extension pole is not shown to be retractable. As such, the ability to transport this tool is limited, and is not possible to store in a day bag when not in use.

Buckwing Products, Inc. makes an extension saw and pruner. This product measures 21 inches when folded up.

Gowayout.com sells a saw that is comprised of three pieces, a saw, a trimmer and a pole. The pole does not connect directly to the saw, but rather to the trimmer.

Stoney Point makes a pole saw for use with a PoleCat Monopod.

United States patent number (hereafter "USPN") U.S. Pat. No. 6,240,642 to Templeton is titled Compact Pruning Saw. This patent shows a telescoping series of coaxial nested tubes that extend to provide an elongated handle. Each inner tube has a back end with a gradual conical flare. At full extension, the tube stops bind against each other, and screws and clamps are explicitly taught to be unnecessary. A saw blade with a threaded end is fitted into a threaded fitting on the end of the innermost tube. While this product may work well for its intended purposes, it is not without some drawbacks. First, there is no way to lock segments in place intermediate a fully extended and the fully retracted positions. Also, there is no way to use the present invention as a hand saw or folding saw.

U.S. Pat. No. 4,716,653 to Skyba is titled Tree Saw with Extension Attachment. This patent teaches that a tree saw uses a flexible sapling or tree limb as a handle extension to permit a person to cut tree branches beyond his normal reach. One drawback with this invention is that its use is dependent upon the location of a suitable flexible sapling or tree limb. Further, the destruction of a sapling or tree limb can unnecessary take a toll on the environment.

U.S. Pat. No. 5,911,481 to Yost is titled Pocket Hand Saw. This invention describes a water tight compartment for storing the blade when not in use. While this invention may be useful for its intended purpose, it does not show the use of an extension.

All of these products may all work well for their intended purposes. Yet, none of them shows an extension saw that is compactable to approximately 12 inches or less.

None of the above-products are designed for storage or transport in a side-by-side connected manner.

None of the above-products utilize a generally I beam design to increase the strength to weight ratio.

None of the above-products has a snap fitting and direct connection between the pole and the saw.

Thus there exists a need for an extendable folding saw that solves these and other problems.

SUMMARY

The present invention relates to an extendable folding saw that is lightweight and compact when retracted yet rigid when extended. In one embodiment, the extendable folding saw can have a folding saw and a removably attached extension. The folding saw can have a grip and a pivotally attached saw. The extension can comprise several members that are compactable to a length not much greater than the length of the longest individual member. The members of the extension rod can have a generally I shaped profile. The extension rod can be attached to the folding saw in a snap-fitting manner for use. A retracted folding saw can be snapped side-by-side to a retracted extension for storage.

Advantageously, the extendable folding rod of the present invention is compact in size. This is accomplished by having the invention compact in size to a length slightly greater than the size of the blade. The present invention can be easily transported in backpacks and the like.

Further, the present invention has a relatively large strength to weight ratio. This is advantageously accomplished in a preferred embodiment by having telescoping generally I shaped members. The I shaped design provides stiffness, or resistance to bending, along the direction of the applied force during use of the saw.

Still further, hunters and others will be able to use the present invention in a safe manner. This can be accomplished because the extendable folding saw is extendable up to approximately five feet in length or more depending on application and is light weight.

The user can, for example, effectively use the saw to clear shooting lanes while in the tree stand. Being lightweight, the extendable folding saw will minimize fatigue of the user while using the present invention. It is noteworthy that the overall length of the extension rod is variable, depending on the intended use by the user.

Still further yet, the extension rod directly connects to the folding saw. This is advantageous as it minimizes complexity of the present invention by eliminated extra components. Related, the extension can be connected to the folding saw in a snap fitting engagement.

Other advantages, benefits, and features of the present invention will become apparent to those skilled in the art upon reading the detailed description of the invention and studying the drawings.

BRIEF DESCRIPTION OF THE DRAWINGS

FIG. 5 is a side illustration showing an alternative embodiment of the present invention in an extended position.

FIG. 6 is a side view of the embodiment shown in FIG. 5 in a shortened length.

FIG. 7 is a side view of the embodiment shown in FIG. 5 is a fully compacted length.

FIG. 10 is a perspective view of an additional embodiment of the present invention shown in an extended position.

FIG. 11 is a perspective view of the embodiment shown in FIG. 10.

DETAILED DESCRIPTION

Figure 1:
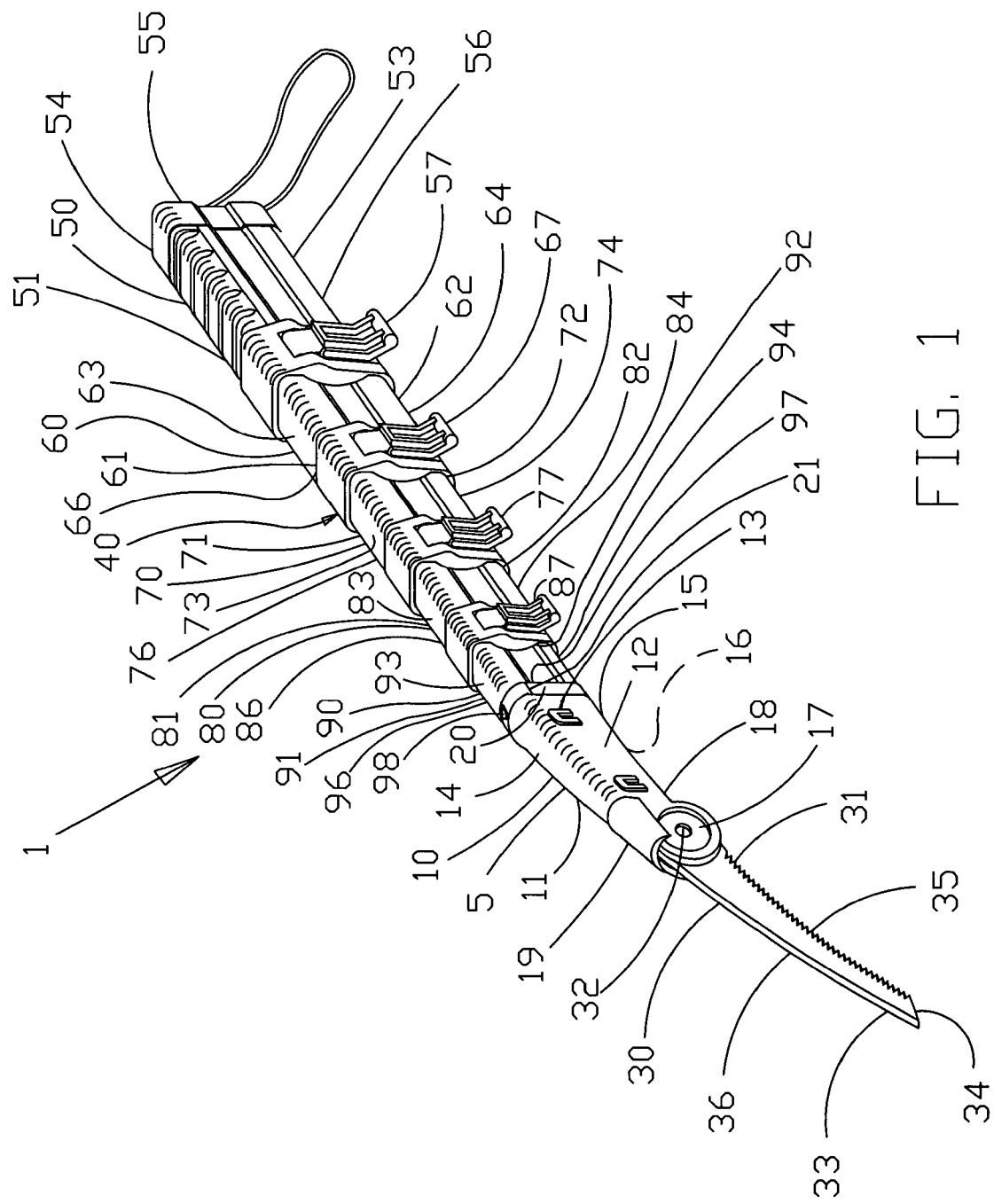
FIG. 1 is a perspective view of an embodiment of the present invention showing the extension rod partially extended.
Figure 2:
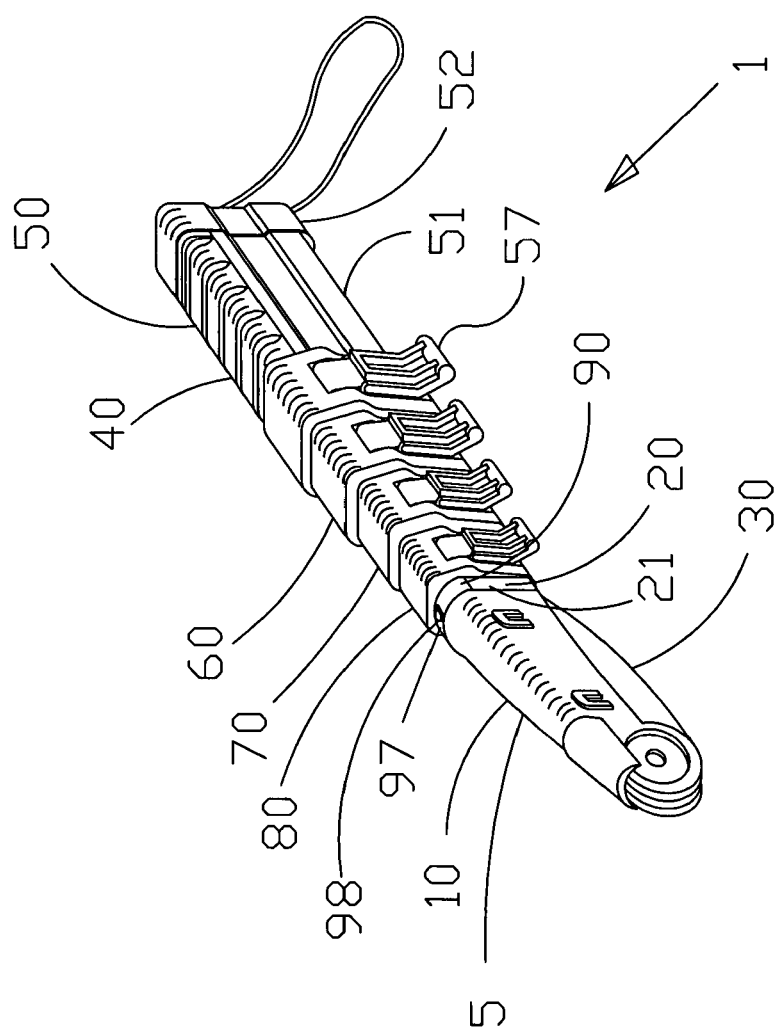
FIG. 2 is a perspective view of the embodiment shown in FIG. 1 with the extension rod retracted and connected to the saw.

While the invention will be described in connection with several preferred embodiments, it will be understood that it is not intended to limit the invention to those embodiments. On the contrary, it is intended to cover all alternatives, modifications and equivalents as may be included within the spirit and scope of the invention as defined by the appended claims.

Looking now to FIGS. 1-4, it is seen that a first preferred embodiment of the extendable folding saw I of the present invention is shown. The extendable folding saw 1 is comprised of a folding saw 5 and an extension rod 40. It is understood that size of the present invention is relative, and that some degree of overall size variation is understood.

The folding saw 5 has a handle 10, or grip. The handle 10 has sides 11 and 12. Side 12 has a half of a pair of snaps 13 thereon. The handle 10 further has a top 14 and a bottom 15. The bottom 15 has a cavity therein. A pivot 18 and release 19 are at an end 17 of the handle 10. The opposed end 20 has a snap fitting 21 thereon. The snap fitting 21 can comprise a channel having a generally T shaped profile. Holes can be in the side of the T shaped channel for receiving detents (described below). The handle 10 can be made of glass filled nylon or any other suitable material.

Snaps 13 can be of any desired configuration. However, in the preferred illustrated embodiment, the snaps have a first lip perpendicular to the side 12 and a second lip offset from and parallel to side 12. Further, a channel is formed through the second lip, and mating snaps (described below) can be removably connected to snaps 13.

The folding saw 5 further comprises a saw 30. The saw 30 has an end 31 with a pivot 32. Opposed to end 31 is end 33. End 33 terminates in a point 34. The saw 30 has a cutting edge 35 and an opposed dull edge 36. The blade can be made of a stainless steel or any other suitable material.

The pivot 32 of the saw is preferably pivotally connected to the pivot 18 of the handle 10. The cutting edge 35 of the saw 30 can be received within the cavity 16 in the bottom 15 of the handle 10, and the dull edge 36 can project from the cavity. When pivoted for use, the end 33 of the saw 30 is remote from the end 20 of the handle 10. It is understood that saw 30 is an interchangeable saw.

The extension rod 40, or simply the extension, can comprise a grip 50 and several members 60, 70, 80 and 90, respectively. More or less members can alternatively be used without departing from the broad aspects of the present invention. The grip 50 can be made from or covered with foam or rubber or any other material. The members 60, 70, 80 and 90 can be made of extruded aluminum or any other suitable material, and can respectively have uniform dimensions along their respective lengths. As illustrated herein, the extension 40 can be fully collapsed, fully extended, or positioned between fully collapsed and extended.

Grip 50 has a side 51. Side 51 has a half of a pair of snaps 52 thereon. The half of pair of snaps 52 can be mated, snapped or otherwise removably secured to the corresponding half of pair of snaps 13 on the handle 10 of the saw 5. This is accomplished in the preferred embodiment by providing a snap 14 with a shaft and a head, wherein the head is snapped into a cavity formed by the first and second lips of snap 13, and the shaft of snap 14 can pass between the channel formed through the second lip in snap 13.

Grip 50 further has an opposed side 53. An end 54 is provided. An end cap 55 can cover end 54 of the grip. A lanyard can be connected to the end cap 55. End 56 is opposite of end 55. End 56 is preferably an open end opening to the hollow interior of the grip. A compression latch 57 is preferably at the end 56 of the grip. The body of the grip has a generally I shaped cross-section, and has a uniform profile along its length.

Extension member 60 has side 61, side 62, top 63, bottom 64, a first end, and a second end 66. A compression latch 67 is at the second end 66 of the extension member 60. The sides 61 and 62, the top 63 and the bottom 64 define a generally I shaped cross-section and has a uniform profile along its length. The body of extension member 60 is slightly smaller than the body of the grip 50, wherein the extension member 60 can telescopingly mate with the grip. This is accomplished as the first end of the extension member 60 is received within the second end 56 of the grip 50. Compression latch 57 of the grip 50 can lock the extension member 60 in a selected linear position relative to the grip 50.

Extension member 70 has side 71, side 72, top 73, bottom 74, a first end, and a second end 76. A compression latch 77 is at the second end 76 of the extension member 70. The sides 71 and 72, the top 73 and the bottom 74 define a generally I shaped cross-section and has a uniform profile along its length. The body of extension member 70 is slightly smaller than the body of extension member 60, wherein the extension member 70 can telescopingly mate with the extension member 60. This is accomplished as the first end of the extension member 70 is received within the second end 66 of extension member 60. Compression latch 67 of extension member 60 can lock the extension member 70 in a selected linear position relative to the extension member 60.

Extension member 80 has side 81, side 82, top 83, bottom 84, a first end, and a second end 86. A compression latch 87 is at the second end 86 of the extension member 80. The sides 81 and 82, the top 83 and the bottom 84 define a generally I shaped cross-section and has a uniform profile along its length. The body of extension member 80 is slightly smaller than the body of extension member 70, wherein the extension member 80 can telescopingly mate with the extension member 70. This is accomplished as the first end of the extension member 80 is received within the second end 76 of extension member 70. Compression latch 77 of extension member 70 can lock the extension member 80 in a selected linear position relative to the extension member 70.

Extension member 90 has side 91, side 92, top 93, bottom 94, a first end, and a second end 96. The sides 91 and 92, the top 93 and the bottom 94 define a generally I shaped cross-section and has a uniform profile along its length. The body of extension member 90 is slightly smaller than the body of extension member 80, wherein the extension member 90 can telescopingly mate with the extension member 80. This is accomplished as the first end of the extension member 90 is received within the second end 86 of extension member 80. Compression latch 87 of extension member 80 can lock the extension member 90 in a selected linear position relative to the extension member 80.

A snap fitting 97 is at the second end 96 of extension member 90. The snap fitting 97 can be comprised of a generally T shaped piece. Detents can be selectably projectable from the sides of the T shaped piece. The snap fitting 97 mates with snap fitting 21 by sliding the T generally shaped piece into the generally T shaped channel of the folding saw 5 to directly connect these two components. A release button 98 is provided to allow the snap fittings 97 and 21, respectively, to be disengaged. Pressing the release button 98 causes the detents to retract into the generally T shaped member to allow the generally T shaped piece to slide out of engagement with the generally T shaped channel.

Figure 3:
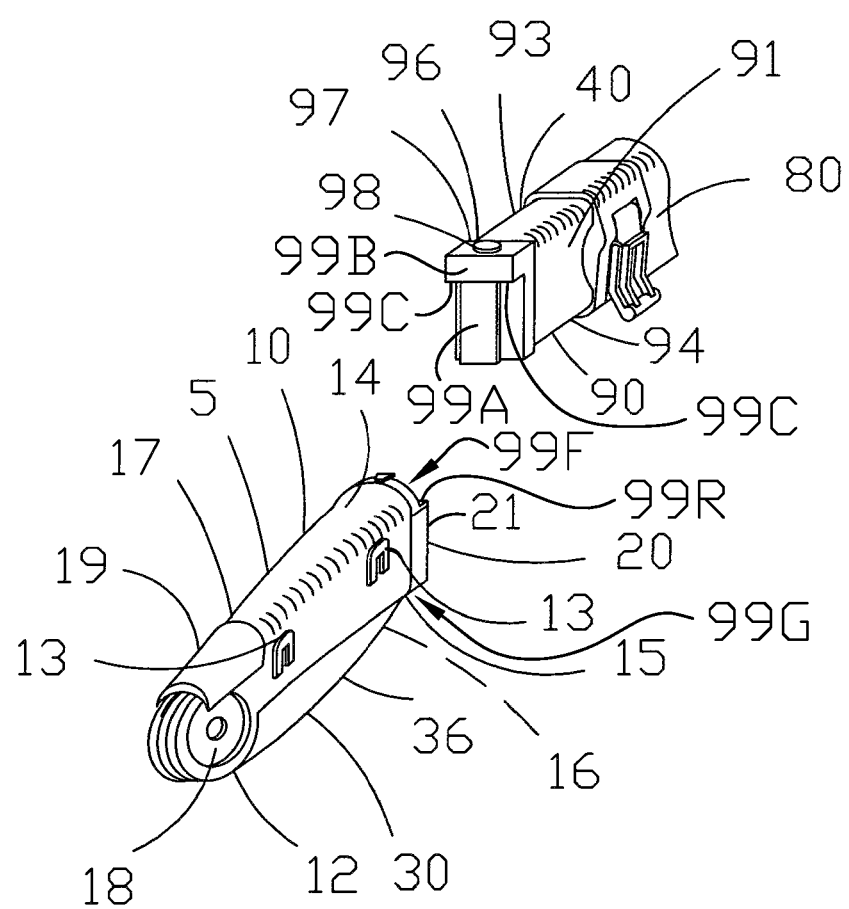
FIG. 3 is a close-up perspective view of the extension rod separated from the saw.
Figure 4:
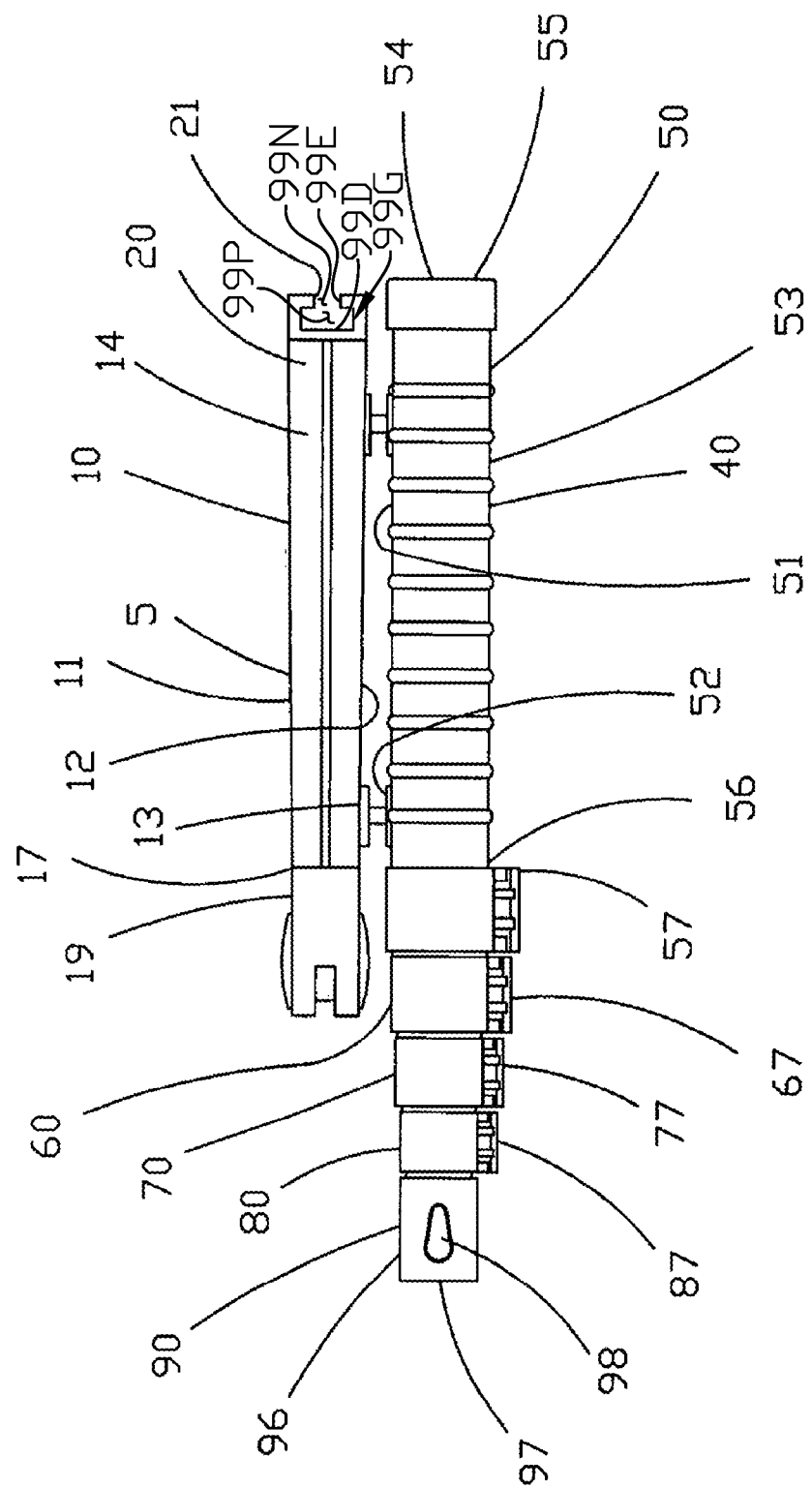
FIG. 4 is a top view of the extension rod and saw in the storage position.

With reference to FIGS. 3 and 4, the fitting 97 can be referred to as an anchor configured to mate with the saw 5 to mount the saw on the extension 90. The anchor 97 includes a transverse part 99A and an abutment part 99B having an abutment surface 99C. The fitting 21 includes a cavity 99D including an opening 99E and defining first and second side openings 99F, 99G on opposite sides of the fitting 21. The fitting 21, and in particular the side openings 99F, 99G will be described in further detail with reference to the second side opening 99G shown facing out of the page in FIG. 4. Second side opening 99G has a length L extending from the opening 99E toward a closed end of the side opening opposite the opening 99E. The second side opening 99G includes a first edge on a first side of the side opening 99G and a second edge on a second side of the side opening opposite the first edge. The first edge of the second side opening 99G includes a first edge segment 99H extending along the length of the side opening, a second edge segment 99I, and a corner 99J therebetween. The second edge of the second side opening 99G includes a first edge segment 99K extending along the length of the side opening, a second edge segment 99L, and a corner 99M therebetween. The first edge segment 99H and second edge segment 99I are oriented with respect to one another to form an L shape. The first edge segment 99K and second edge segment 99L are oriented with respect to one another to form an L shape. The second side opening 99G includes a first side opening segment 99N extending from the opening 99E toward the closed end of the side opening. The second side opening 99G also includes a second side opening segment 99P extending from the first side opening segment 99N generally transversely with respect to the first side opening segment. The fitting 21 includes a first outer surface 99Q extending around edges of the second side opening 99G and includes a second outer surface 99R (FIG. 3) opposite the first outer surface 99Q. The second outer surface 99R extends around edges of the first side opening 99F. When the fitting 21 is connected to the anchor 97, the anchor inhibits the fitting 21 from separating from the anchor in a direction extending away from the extension 90 along a longitudinal axis of the extension; the abutment part 99B overlies edges of the first side opening 99F on opposite sides of the first side opening and overlies the outer surface 99R of the fitting 21; and the abutment surface 99C abuts the outer surface 99R of the fitting 21 on opposite sides of the side opening 99F. The release 98 is located on an outboard side of the abutment part 99B opposite the abutment surface 99C.

Looking now more closely at FIG. 4, it is seen that the folding saw 5 and extension rod 40 can be stored in a side-by-side manner by mating the snaps 13 and 52, respectively on side 12 of the handle 10 of the folding saw 5 and on side 51 of the grip 50 of the extension rod 40.

It is appreciated that the extension members 60, 70, 80 and 90 have a similar but not necessarily equal length, and each is similar in length but not necessarily equal to the length of the grip 50.

It is further appreciated that a twisting lock, or other suitable lock, could be used in place of the compression latch flaps without departing from the broad aspects of the present invention.

It is still further appreciated that the overall length of the extension rod 40 is variable. This is accomplished by having one or more or the extension members 60, 70, 80 and 90, respectively, be locked in place somewhere intermediate fully extended and fully retracted.

It is understood that the illustrated compression latches operate by constricting the interior size of its respective member upon the member received there within. Yet, it is further understood that alternative latches or compression latches can be utilized without departing from the broad aspects of the present invention. For example, the latch could be operated to drive a pin into a channel in the adjacent received member. Unfastening of the latch would remove the pin from the corresponding slot. It is appreciated that one or more extension members could be extended while the others remain locked in their respective retracted positions.

Turning now to FIGS. 5-7, an alternative embodiment is shown. This embodiment has a saw 101 comprised of a first piece 110 with a grip 111 and a cavity 112. The grip can be comprised of a rubber overmolding.

A second piece 120 is provided having a grip 121, a hollow interior 122 and a compression latch 123. The grip 121 can be comprised of a rubber overmolding. The second piece 120 is pivotally connected to the first piece 110, such that cavity 112 of the first piece 110 faces the hollow interior 122 of the second piece 120 when pivoted to the closed position.

A third piece 130 is further provided. The third piece 130 can comprise a beam 131, which may have a generally I shaped profile. The third piece 130 has two ends. The first end is connected to the second piece 120, and can be removably slid therein into the hollow interior 122. The compression latch 123 is used to lock the third piece 130 in a desired linear position relative the second piece 120. The position can be fully retracted as shown in FIG. 6, fully extended as shown in FIG. 5, or any position intermediate fully extended and fully retracted. A compression latch 132 can be located at the second end of the beam 131.

A fourth piece 140 is further provided. The fourth piece 140 can comprise a beam 141, which may have a generally I shaped profile. The fourth piece 141 has two ends. The first end is connected to the third piece 130, and can be removably slid therein into the hollow interior of the beam 131. The compression latch 132 of the third piece 130 is used to lock the fourth piece 140 in a desired linear position relative the third piece 130. The position can be fully retracted as shown in FIG. 6, fully extended as shown in FIG. 5, or any position intermediate fully extended and fully retracted. A blade lock 142 can be located at the second end of the beam 141.

A blade 150 is further provided. The blade has a cutting edge 151 and a dull edge. The blade 150 further has two ends. The first end is pivotally connected to the second end of beam 141. When the saw 101 is fully compacted, the dull edge 152 of the blade 151 is fully received within the cavity 112 of the first piece 110. Blade lock 142 can be used to maintain the position of the blade 150 when the saw 101 is in the fully extended position and the shortened position.

Figures 8, 9:
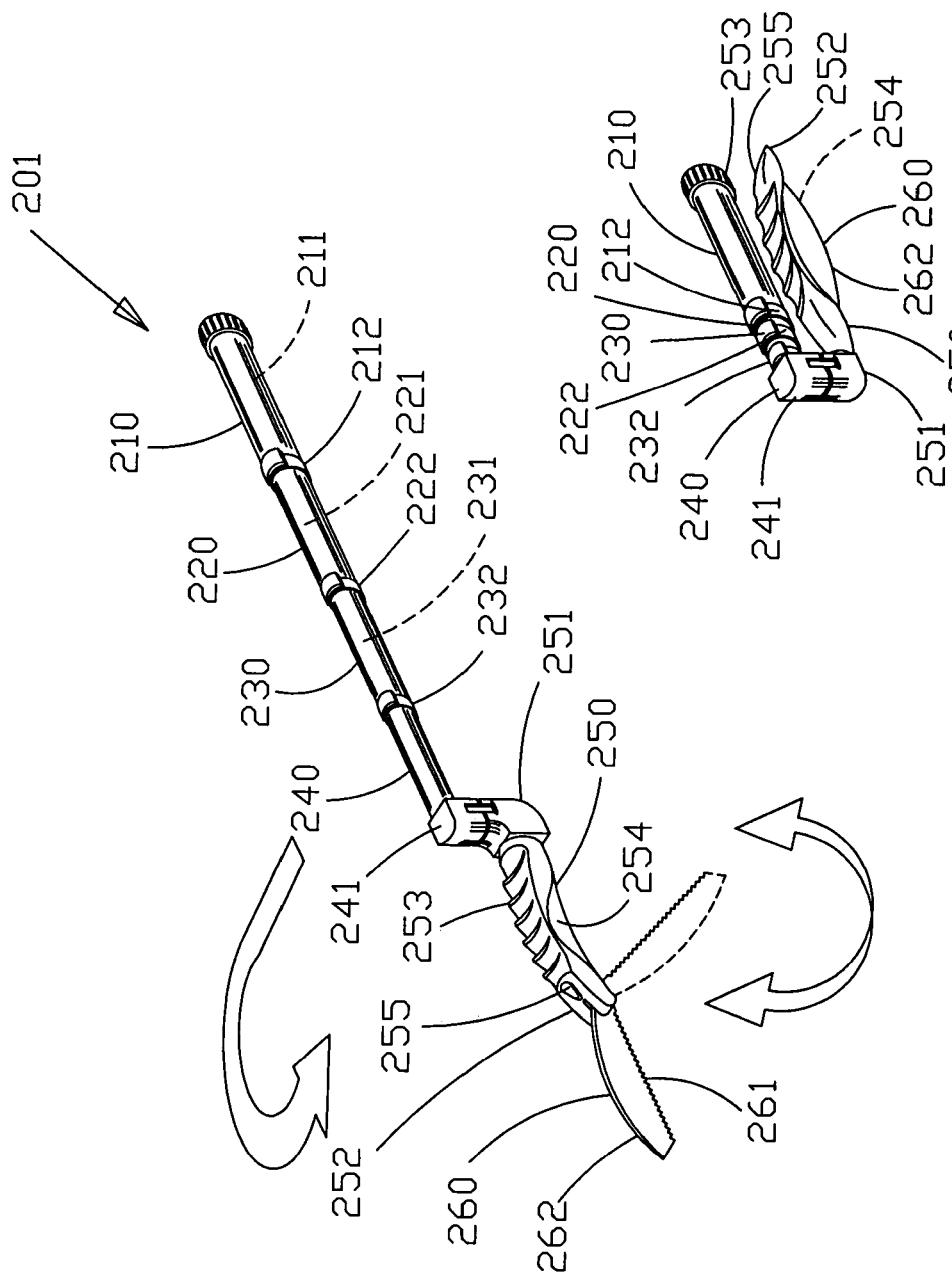
FIG. 8 is a perspective view of an additional alternative embodiment of the present invention shown in an extended position.
FIG. 9 is a perspective view of the embodiment shown in FIG. 8 in a compacted position.

Turning now to FIGS. 8 and 9, it is shown that an additional alternative embodiment is shown. A saw 201 is provided. The saw has a first piece 210. The first piece 210 has two ends. The first end is closed with a cap. A compression latch 212 can be at the second end. The second end is an open end that is open to a hollow cavity 211.

A second piece 220 is also provided. The second piece 220 has two ends, and is hollow to define a cavity 221. A compression latch 222 is on the second end of the second piece 220. The first end is connected to the first piece 210, and can be removably slid therein into the hollow interior 211. The compression latch 212 is used to lock the second piece 220 in a desired linear position relative the first piece 210. The position can be fully retracted as shown in FIG. 9, fully extended as shown in FIG. 8, or any position intermediate fully extended and fully retracted.

A third piece 230 is also provided. The third piece 230 has two ends, and is hollow to define a cavity 231. A compression latch 232 is on the second end of the third piece 230. The first end is connected to the second piece 220, and can be removably slid therein into the hollow interior 221. The compression latch 222 is used to lock the third piece 230 in a desired linear position relative the second piece 220. The position can be fully retracted as shown in FIG. 9, fully extended as shown in FIG. 8, or any position intermediate fully extended and fully retracted.

A fourth piece 240 is also provided. The fourth piece 240 has a first end and a second end 241. The first end is connected to the third piece 230, and can be removably slid therein into the hollow interior 231. The compression latch 232 is used to lock the fourth piece 240 in a desired linear position relative the third piece 230. The position can be fully retracted as shown in FIG. 9, fully extended as shown in FIG. 8, or any position intermediate fully extended and fully retracted.

The first piece 210, second piece 220, third piece 230 and fourth piece 240 can have a generally circular shaped profile.

A fifth piece 250 is further provided. The fifth piece 250 has a first end 151 and a second end 252. A handle 253 is provided between the ends 251 and 252. A cavity 254 is provided. A lock 255 is on the second end 252 of the fifth piece 250. The first end 251 is both rotatably and removably connected to the end 241 of the fourth piece 240, as shown in FIG. 8. A pivot lock can be used to lock the fourth piece 240 and fifth piece 250 together in a selected orientation. A snap fitting mechanism can be used to enable removable connection of the end 241 of piece 240 and the end 251 of piece 250.

A blade 260 is further provided having a cutting edge 261 and a dull edge 262. The blade has a first end and a second end. The first end is pivotally connected to the fifth piece 250. The blade lock 255 releasably locks the blade 260 in a desired orientation with respect to the fifth piece 250.

The fifth piece 250 and blade 260 can be disconnected from the remainder of the pieces by disconnecting the first end 251 of the fifth piece 250 from end 141 of the fourth piece 240. In this regard, the fifth piece 250 and blade 260 can be used as a folding saw. The saw 201 can be fully compacted. This is accomplished by pivoting the blade 260 into the cavity 254 of the fifth piece, rotating the fifth piece 250 relative the fourth piece 240 about end 241, retracting the fourth piece 240 into the third piece 230, retracting the third piece 230 into the second piece 220, and retracting the second piece 220 into the first piece 210.

Turning now to FIGS. 10 and 11, a further preferred embodiment is shown.

Accordingly, a saw 301 is provided. The saw 301 has a first piece 310. The first piece 310 is comprised of a generally C shaped channel 311 having a first end 312 and a second end 313. A rubber grip pad can be affixed to the outside of the channel 311.

A second piece 320 is also provided. The second piece 320 is comprised of a generally C shaped channel 321 having a first end 322 and a second end 323. The first end 322 is pivotally connected to the second end 313 of the first piece 310. In this regard, the second piece 320 can collapse into the first piece 310 for storage.

A third piece 330 is also provided. The third piece 330 is comprised of a generally G shaped channel 331 having a first end 332 and a second end 333. The first end 332 is pivotally connected to the second end 323 of the second piece 320. In this regard, the third piece 330 can collapse into the second piece 320 for storage.

A fourth piece 340 is farther provided. The fourth piece 340 has a first end 341 and a second end 342. A cavity 343 is also provided in the fourth piece 340. A blade lock 344 is on the second end 342 of the fourth piece 340. The first end 341 of the fourth piece 340 is pivotally connected to the second end 333 of the third piece 330. In this regard, the fourth piece 340 can collapse into the third piece 330 for storage.

A blade 350 is further provided. The blade 350 has a cutting edge 351 and a dull edge 352. The blade 351 further has a first end and a second end. The first end is pivotally connected to the second end 342 of the fourth piece 340. The blade lock 344 can be used to lock the blade 350 in position relative the fourth piece 340. The cutting edge 351 can be rotated into the cavity 343 of the fourth piece 340. The rotation of blade 350 relative the fourth piece 340 occurs along an axis that is generally perpendicular the axis of rotation between the fourth piece 340 and third piece 330, the third piece 330 and the second piece 320, and the second piece 320 and the first piece 310.

The blade 350 can be released from the cavity 343 of the fourth piece 340 only when the fourth piece is rotated out of the third piece 330.

Figures 12, 13:
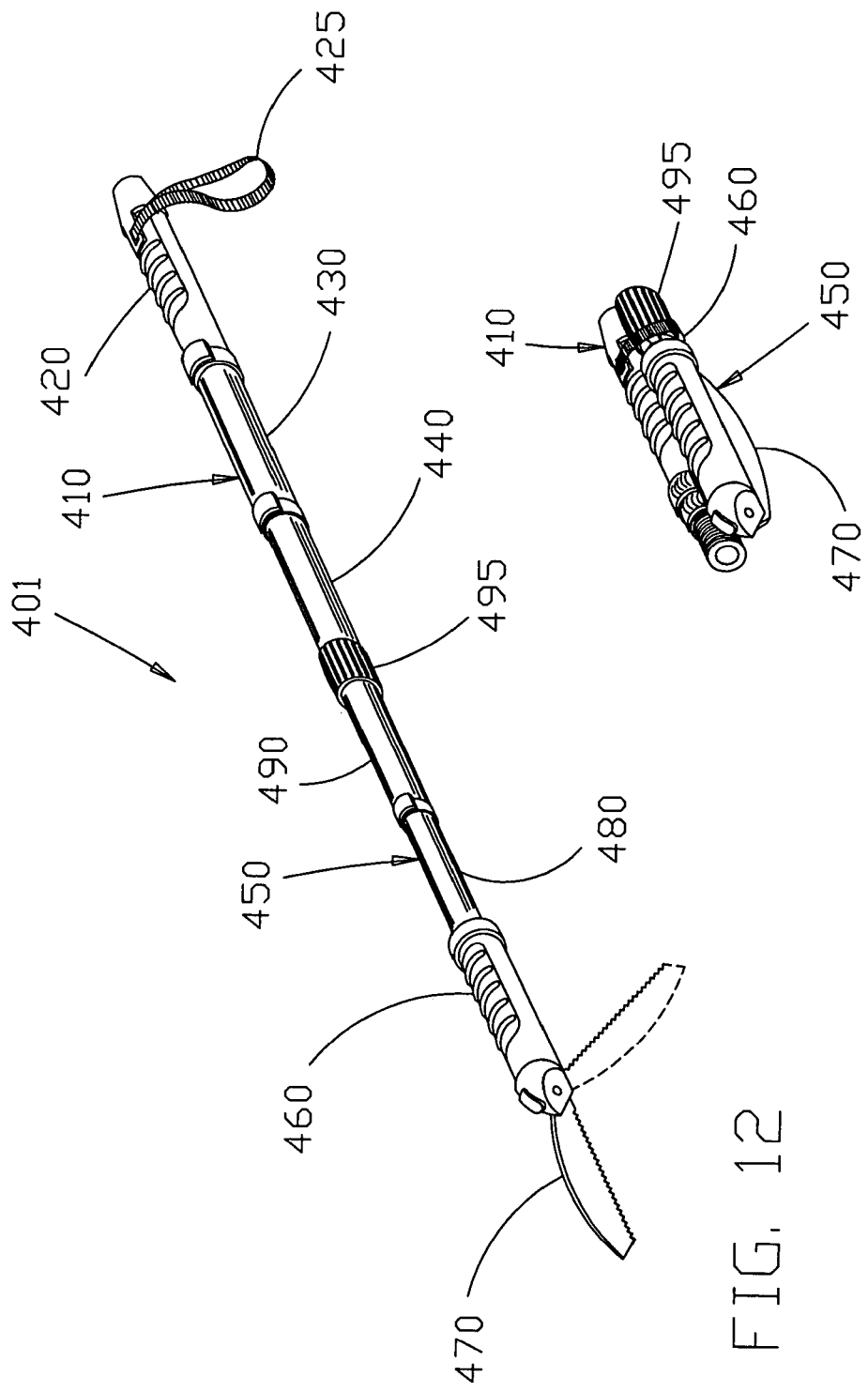
FIG. 12 is a perspective view of an additional embodiment of the present invention shown in an extended position.
FIG. 13 is a perspective view of the embodiment shown in FIG. 12 shown in a compacted position.
Figure 14:
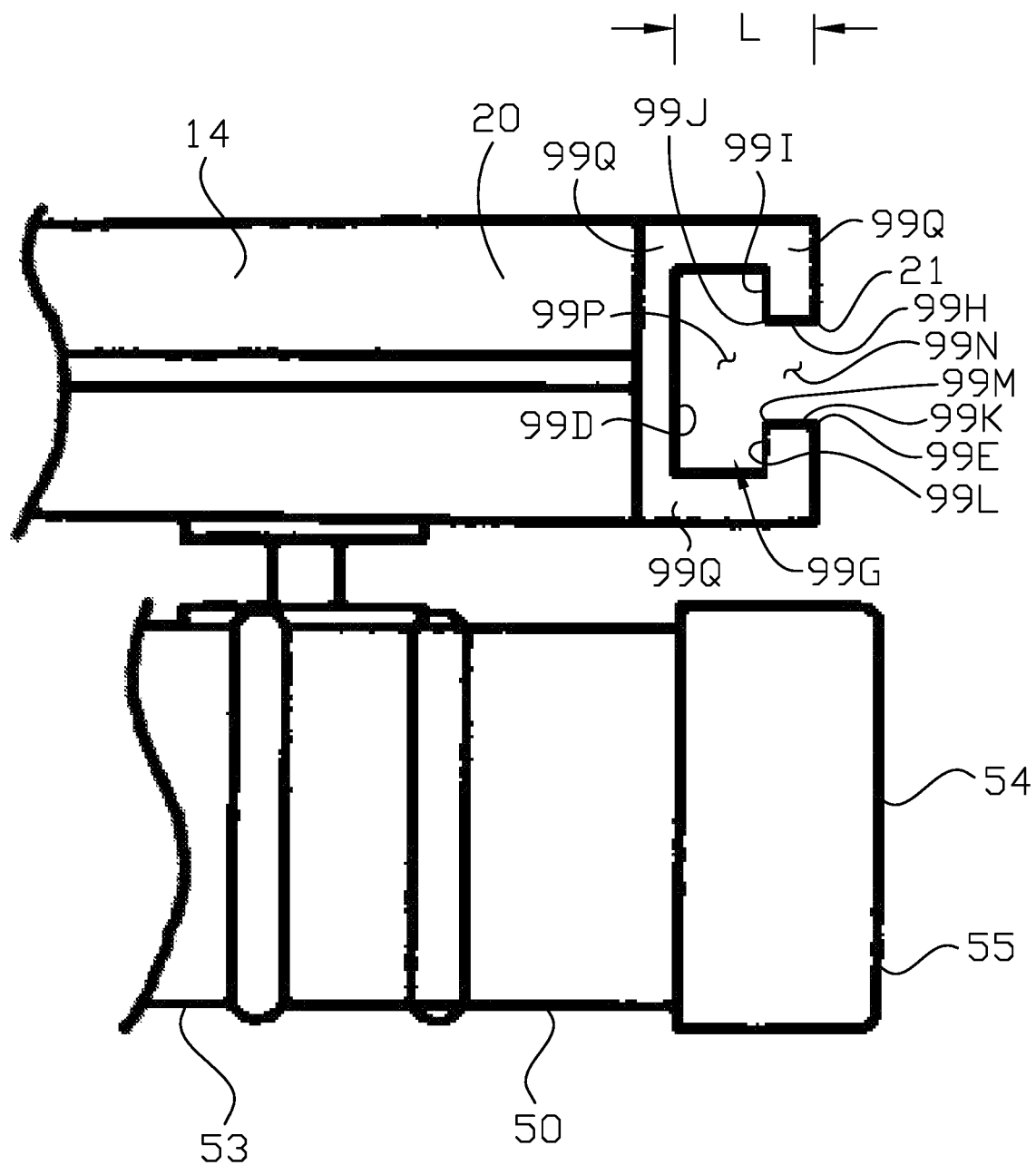
FIG. 14 is an enlarged detail view of a portion of FIG. 4.

Turning now to FIGS. 12 and 13, it is seen that an additional alternative preferred embodiment is shown. The saw 491 has a first component 410 and a second component 450.

The first component 410 has an end piece 420. The end piece 420 has two ends. The first end is closed with a cap. A compression latch can be at the second end. The second end is an open end that is open to a hollow cavity. An elastic band 425 is preferably attached to the end piece 420.

A first extension rod 430 is also provided. The first extension rod 430 has two ends, and is hollow to define a cavity. A compression latch is on the second end of the first extension rod. The first end is connected to the end piece, and can be removably slid therein into the hollow interior. The compression latch of the end piece is used to lock the first extension rod in a desired linear position relative the end piece. The position can be fully retracted as shown in FIG. 13, fully extended as shown in FIG. 12, or any position intermediate fully extended and fully retracted.

A second extension rod 440 is also provided. The second extension rod 440 has two ends, and is hollow to define a cavity. The first end is connected to the first extension piece 430, and can be removably slid therein into the hollow interior. The compression latch of the first extension rod 430 is used to lock the second extension rod 440 in a desired linear position relative the first extension rod 430. The position can be fully retracted as shown in FIG. 13, fully extended as shown in FIG. 12, or any position intermediate fully extended and fully retracted. The second end of the second extension rod is preferably externally threaded.

The second component 450 has an end piece 460. The end piece 460 has two ends. A blade 470 is pivotally attached to the first end of the end piece 460. A blade release is provided for locking the blade 470 in the open position. The blade 40 can be pivoted to a closed position wherein it is stored in a cavity in the end piece 460. A compression latch can be at the second end. The second end is an open end that is open to a hollow cavity.

A first extension rod 480 is also provided. The first extension rod 480 has two ends, and is hollow to define a cavity. A compression latch is on the second end of the first extension rod. The first end is connected to the end piece, and can be removably slid therein into the hollow interior. The compression latch of the end piece is used to lock the first extension rod in a desired linear position relative the end piece. The position can be fully retracted as shown in FIG. 13, fully extended as shown in FIG. 12, or any position intermediate fully extended and fully retracted.

A second extension rod 490 is also provided. The second extension rod 490 has two ends, and is hollow to define a cavity. The first end is connected to the first extension piece 480, and can be removably slid therein into the hollow interior. The compression latch of the first extension rod 480 is used to lock the second extension rod 490 in a desired linear position relative the first extension rod 480. The position can be fully retracted as shown in FIG. 13, fully extended as shown in FIG. 12, or any position intermediate fully extended and fully retracted.

A coupler 495 is preferably attached to the second end of the second extension rod 490 of the second component 450. The coupler is preferably internally threaded so as to be able to mate with the externally threaded end of the second extension rod 440 of the first component 410.

The saw 410 can be compacted, as shown in FIG. 13. This is accomplished by first disengaging the first component 410 and second component 450 by threadably removing the end of the second extension rod 440 of the first component 410 from the coupler 495. Next each of the first component 410 and the second component 450 are individually compacted. Finally, the first and second components 410 and 450 are secured together with the elastic band 425.

Thus it is apparent that there has been provided, in accordance with the invention, an extendable folding saw that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:
1. A pole saw comprising:
a pole assembly including an elongate pole having a proximal end portion, a distal end portion, and a longitudinal center axis, the elongate pole including a plurality of pole sections, the plurality of pole sections including a first pole section and a second pole section, the elongate pole having an extended configuration and a retracted configuration, the first pole section being movable with respect to the second pole section for changing the configuration of the elongate pole between the extended and retracted configurations;
a saw including a blade and a blade support, the blade including a cutting edge adapted for cutting, the blade support including a proximal end and a distal end opposite the proximal end, the blade having a proximal end, a distal end, and a length extending therebetween, the proximal end of the blade being connected to the distal end of the blade support, the blade support including a cavity in which the pole assembly is receivable for mounting the folding saw on the pole assembly, the cavity having an opening at the proximal end of the blade support, said opening facing away from the distal end of the blade support, the cavity extending distally in the blade support toward the distal end of the blade support, the cavity opening out of the blade support on opposing sides of the blade support to define first and second side openings in the opposing sides of the blade support, the first and second side openings extending from the opening of the cavity at the proximal end of the blade support distally along the blade support toward the distal end of the blade support;
wherein the pole assembly includes an anchor configured to mate with the blade support to mount the folding saw on the pole assembly, the anchor including a transverse part having a first end portion, a second end portion, and a length extending therebetween generally transverse to the longitudinal center axis of the elongate pole, the anchor including an abutment part at the first end portion of the transverse part, the abutment part defining an abutment surface facing toward the second end portion of the transverse part, the transverse part being receivable in the cavity and side openings of the blade support and the abutment surface being located to abut the blade support to mount the saw on the pole assembly;
wherein when the anchor is mated with the blade support to mount the saw on the pole assembly:
  the first end portion of the transverse part is received in the first side opening;
  the second end portion of the transverse part is received in the second side opening;
  the anchor inhibits the blade support from separating from the pole assembly in a direction extending distally away from the distal end of the elongate pole;
  the abutment part at least partially overlies an edge of the first side opening and an outer surface of the blade support facing laterally with respect to the longitudinal center axis of the elongate pole and away from the second side opening;
  the abutment surface abuts said outer surface of the blade support;

the elongate pole extends from the proximal end portion of the elongate pole to the distal end portion of the elongate pole in a direction toward the blade, the blade support extends from the proximal end of the blade support to the distal end of the blade support in a direction away from the proximal end portion of the elongate pole, and the blade extends from the distal end of the blade support.

2. A pole saw as set forth in claim 1, wherein the saw comprises a folding saw, the blade support including a recess into which the blade is foldable to a folded configuration with respect to the blade support, and wherein when the anchor is mated with the blade support to mount the folding saw on the pole assembly and the blade is in the folded configuration, the distal end of the blade is spaced from the distal end portion of the elongate pole toward the distal end of the blade support.

3. A pole saw as set forth in claim 2, wherein the blade support includes a pole connector defining the cavity and the first and second side openings.

4. A pole saw as set forth in claim 3, wherein the blade support includes a main body defining the recess into which the blade is foldable to the folded configuration, the connector being secured to the main body.

5. A pole saw as set forth in claim 1, wherein the first side opening includes a first segment extending from said opening at the proximal end of the blade support distally along the blade support toward the distal end of the blade support, and the first side opening includes a second segment extending from the first segment of the first side opening generally transversely with respect to the first segment of the first side opening, and wherein when the anchor is mated with the blade support to mount the saw on the pole assembly, the reception of the first end portion of the transverse part in the second segment of the first side opening inhibits the blade support from separating from the pole assembly in said direction extending distally away from the distal end of the elongate pole.

6. A pole saw as set forth in claim 5, wherein the second side opening includes a first segment extending from said opening at the proximal end of the blade support distally along the blade support toward the distal end of the blade support, and the second side opening includes a second segment extending from the first segment of the second side opening generally transversely with respect to the first segment of the second side opening, and wherein when the anchor is mated with the blade support to mount the saw on the pole assembly, the reception of the second end portion of the transverse part in the second segment of the second side opening inhibits the blade support from separating from the pole assembly in said direction extending distally away from the distal end of the elongate pole.

7. A pole saw as set forth in claim 5, wherein when the anchor is mated with the blade support to mount the saw on the pole assembly, the abutment part at least partially overlies the edge of the first side opening at the second segment of the first side opening and the abutment surface abuts said outer surface of the blade support adjacent the second segment of the first side opening.

8. A pole saw as set forth in claim 5, wherein when the anchor is mated with the blade support to mount the saw on the pole assembly, the abutment part at least partially overlies opposing edges of the first side opening, and the abutment surface abuts said outer surface of the blade support to a first side of the first side opening and to a second side of the first side opening opposite the first side.

9. A pole saw as set forth in claim 5, wherein the anchor includes a release located for manual engagement by a user and movable with respect to the abutment part to selectively permit the anchor to be separated from the pole assembly to disconnect the saw from the pole assembly, the release being located on an outboard side of the abutment part opposite the abutment surface.

10. A pole saw as set forth in claim 1, wherein when the anchor is mated with the blade support to mount the saw on the pole assembly, the abutment part at least partially overlies opposing edges of the first side opening, and the abutment surface abuts said outer surface of the blade support to a first side of the first side opening and to a second side of the first side opening opposite the first side.

11. A pole saw as set forth in claim 1, wherein the anchor includes a release located for manual engagement by a user and movable with respect to the abutment part to selectively permit the anchor to be separated from the pole assembly to disconnect the saw from the pole assembly, the release being located on an outboard side of the abutment part opposite the abutment surface.

12. A pole saw as set forth in claim 1, wherein the second side opening includes a first segment extending from said opening at the proximal end of the blade support distally along the blade support toward the distal end of the blade support, and the second side opening includes a second segment extending from the first segment of the second side opening generally transversely with respect to the first segment of the second side opening, and wherein when the anchor is mated with the blade support to mount the saw on the pole assembly and the blade is in the folded configuration, the reception of the second end portion of the transverse part in the second segment of the second side opening inhibits the blade support from separating from the pole assembly in said direction extending distally away from the distal end of the elongate pole.

13. A pole saw as set forth in claim 1, wherein when the anchor is mated with the blade support to mount the saw on the pole assembly, the reception of the first end portion of the transverse part in the first side opening and the reception of the second end portion of the transverse part in the second side opening inhibits the blade support from separating from the pole assembly in the direction extending distally away from the distal end of the elongate pole.

14. A pole saw as set forth in claim 1, wherein the abutment part is immovable with respect to the transverse part.

15. A pole saw as set forth in claim 1, wherein the blade includes opposite side faces facing transversely with respect to the cutting edge, the saw blade lying in a blade plane such that the side faces are positioned on opposite sides of the blade plane and are generally parallel with the blade plane, and wherein the blade plane intersects the first side opening and the second side opening.

16. A pole saw as set forth in claim 1, wherein at least one of the first side opening and the second side opening includes a first edge segment and a second edge segment, the first and second edge segments oriented with respect to one another to form an L shape.

17. A pole saw as set forth in claim 1, wherein at least one of the first side opening and the second side opening has a length extending from the opening at the proximal end of the blade support to a closed end of the side opening, the at least one of the first and the second side opening including a first edge on a first side of the side opening and a second edge on a second side of the side opening opposite the first edge, the first edge of the side opening including a first edge segment extending along the length of the side opening, a second edge segment, and a corner therebetween, the second edge including a first edge segment extending along the length of the side opening, a second edge segment and a corner therebetween.

18. A pole saw as set forth in claim 1, wherein the saw comprises a folding saw, the blade support including a recess into which the blade is foldable to a folded configuration with respect to the blade support.

* * * * *

UNITED STATES PATENT AND TRADEMARK OFFICE
CERTIFICATE OF CORRECTION

PATENT NO.        : 10,772,261 B1
APPLICATION NO.   : 15/459953
DATED             : September 15, 2020
INVENTOR(S)       : Andrew Hooyman et al.

Page 1 of 1

It is certified that error appears in the above-identified patent and that said Letters Patent is hereby corrected as shown below:

In the Claims

In Column 10, Claim 1, Line 24:
"folding" should be deleted;

In Column 10, Claim 1, Line 38:
"folding" should be deleted;

In Column 12, Claim 12, Line 24:
The claim reference numeral "1", should be replaced with --2--;

In Column 12, Claim 12, Line 33:
--folding-- should be added before the word 'saw'.

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*